United States Patent [19]
Orlowski

[11] Patent Number: 5,498,006
[45] Date of Patent: Mar. 12, 1996

US005498006A

[54] PINNED UNITARY BEARING SEAL

[75] Inventor: David C. Orlowski, Milan, Ill.

[73] Assignee: Inpro Companies, Inc., Rock Island, Ill.

[21] Appl. No.: 439,770

[22] Filed: May 12, 1995

[51] Int. Cl.$^6$ ............................. F02F 11/00; F16J 15/48
[52] U.S. Cl. ............................. 277/53; 277/55; 277/56; 277/57; 277/30; 277/178; 277/11
[58] Field of Search ..................... 277/53, 54, 55, 277/56, 57, 30, 97, 178, 183, 11, 9, 70

[56] References Cited

U.S. PATENT DOCUMENTS

| | | | |
|---|---|---|---|
| 3,350,104 | 10/1967 | Hynes | 277/9 |
| 4,706,968 | 11/1987 | Orlowski | 277/53 |
| 4,890,941 | 1/1990 | Calafell, II et al. | 277/53 |
| 5,171,023 | 12/1992 | Scott et al. | 277/70 |
| 5,335,921 | 8/1994 | Orlowski | 277/178 |
| 5,378,000 | 1/1995 | Orlowski | 277/53 |

*Primary Examiner*—William A. Cuchlinski, Jr.
*Assistant Examiner*—Keith Hwang
*Attorney, Agent, or Firm*—Rockey, Rifkin & Ryther

[57] ABSTRACT

A mechanical labyrinth seal for rotating shafts having first and second ring members. The first ring member, includes a series of annular axially extending grooves and flanges. The second ring member is adopted for insertion into said first ring member with a plurality of complimentary inwardly extending flanges and grooves to form a well known labyrinth seal. There is a slot or channel through the labyrinth or maze connecting the exterior atmosphere to the interior of the seal assembly. The second ring member is adapted to rotate with the shaft and includes an annular recess near the shaft and inwardly toward the housing. There is a plurality of radial holes drilled in the first ring member to be opposite the recess in said second ring member and a plurality of pin members are inserted into the holes in said first ring member and are inserted into the recess of said second ring member. The recess being slightly larger in axial direction than the pin members. Thus, the seal permits axial movement of the shaft while maintaining the labyrinth seal integrity and during a predetermined amount of movement, and upon reaching the limit of said movement, the pins accommodate the axial thrust of the shaft movement. The pins are made of a material having natural lubricity and have only point contact with the walls of the recess, thereby reducing the amount of friction and wear in absorbing the axial thrust.

8 Claims, 1 Drawing Sheet

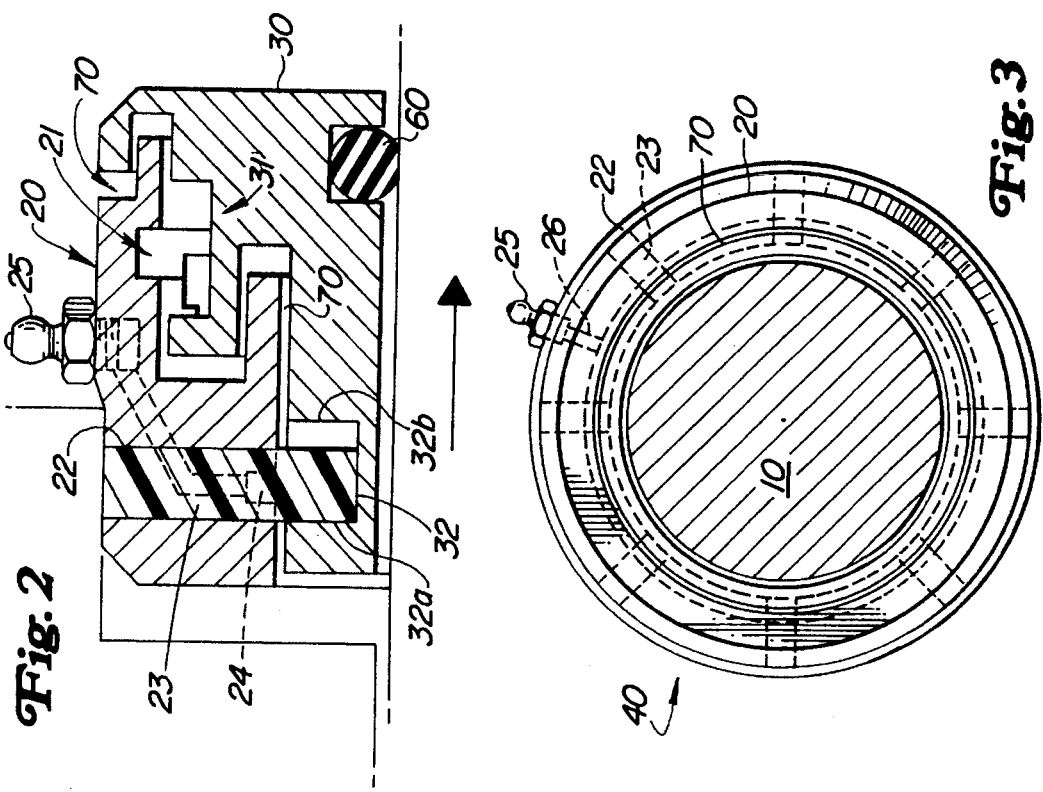
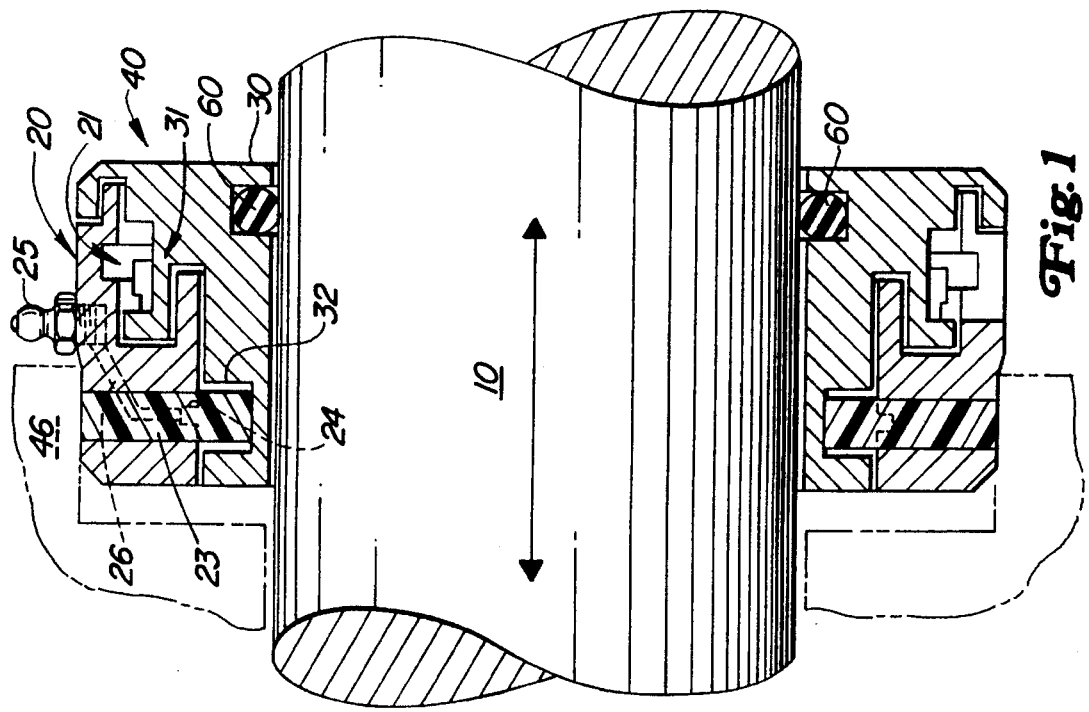

PINNED UNITARY BEARING SEAL

BACKGROUND OF THE INVENTION

1. Field of the Invention

It is important to seal rotating shafts to prevent lubricants associated with the bearings from leaking from the bearing housing and also to prevent contaminants in the environment from proceeding into the lubricant of the bearings.

2. Related Art

Labyrinth seals are described in U.S. Pat. No. 4,706,968 and the prior art cited therein. These seals have labyrinths between a plurality of rings where at least one ring is stationary and one of the ring rotates with the shaft. U.S. Pat. Nos. 4,706,968 and 5,174,583 provide for a third ring member to improve the sealing action of the labyrinth interfaces and to allow for some axial separation of the fixed or stationary ring and the rotating ring while still maintaining a seal. These seals have resolved a great number of the problems related to sealing during axial shaft displacement, however, there continues to be problems in maintaining adequate sealing over a period of time using seals associated with axial shaft displacement. These sealing units are most generally required to accommodate a shaft that simultaneously moves axially and rotatively. This movement occurs with sleeve bearing motors and with long shafts wherein one of the ends of the shaft is tied by means of a fixed bearing and the opposite end is allowed to float.

Previously, the stators and rotors of the bearing isolators were locked together to prevent this axial separation. The axial thrust which occurs between the rotating member and the fixed ring member must be absorbed by the axial faces of the stator and rotor. This thrust and axial shifting sometimes damages bearing isolators which were locked together either by a separate internal locking device or when the bearing isolators were designed with interlocking features as an integral part of their design, such as in U.S. Pat. No. 5,174,583.

This invention is designed to alleviate these destructive thrust forces occurring on the faces of the rotor and stator due to frictional engagement between the rotating member and the stationary member when the shaft moves axially.

BRIEF SUMMARY OF THE INVENTION

An object of the invention is to provide continuous sealing around rotating shafts and associated housings to prevent leakage of lubricants from the housing and entry of the contaminants into the housings and especially during axial shaft movement or displacement. This improvement occurs because of a plurality of pins located in the stationary member and inserted into a recess or cavity in the rotating member. Two piece labyrinth mechanical seals operate based upon the labyrinths to prevent the migration of the lubricants and/or the contaminants in either direction. There is normally one ring of a labyrinth seal secured to the shaft and one ring affixed to the housing which is to be sealed. This invention is an improvement over prior two-piece or three-piece labyrinth mechanical seals, especially labyrinth seals which are subjected to axial movement of the shaft.

The improvement of this invention is provided by inserting a plurality of pins through the stationary or stator member or ring into a recess formed in an area axially removed from the labyrinths in the rotating ring or member. The labyrinths are also designed to allow axial movement of the ring member without the grooves and flanges abutting each other. The movement of the labyrinth channels, grooves and flanges is limited by the axial engagement of the rotating member. These limits are determined by the axial width of the recess and the diameter of the pins. The rotating member is permitted to move with the shaft, a predetermined axial distance before the pins in the fixed member or stator abut the walls of the cavity or recess in the rotating member. This insertion permits a predetermined amount of free axial movement of the rotating ring before the axial thrust must be absorbed by the pins against the radial surface of the cavity in the rotating member.

It is also possible in utilizing this invention to provide lubrication to the interface between the pins and the walls of the recess, and thus further reduce the wear caused by thrust of axial shaft movement. This wear occurring due to the thrust forces between ring and stator are also minimized by the point contact between the walls and consisting of the pins.

DESCRIPTION OF THE DRAWINGS

FIG. 1—is a sectional view showing the improved sealing structure with a horizontal shaft.

FIG. 2—is an enlarged view of the invention showing the shaft and the rotating member in an extreme axial position.

FIG. 3—is an end view showing the relationship between the various members of the sealing structure and the shaft of the present invention.

DETAILED DESCRIPTION OF THE INVENTION

Referring now to FIG. 1, there is shown the sealing structure of the present invention in a typical sealing situation. The sealing rings are shown mounted on shaft 10 in the vertical cross section of FIG. 1. The shaft 10 extends through the bearing housing 40. The bearings are not shown, but are conventionally fitted to the shaft 10 within the housing 40, or adjacent to the rotor, as is the case with sleeve bearing motors. Leakage of the lubricant from or into the housing 40 outwardly and the movement of foreign material or contaminants inwardly into the lubricant in the housing 40 is prevented by the sealing structure of this invention. Also, as is the case with sleeve bearings, lubricant is prevented from migrating along the shaft and into the housing 40.

This novel sealing structure includes a first ring 20 fixed to the housing 40. This ring 20 is normally called the stator ring. The ring 20 includes a plurality of inwardly extending flanges and grooves 21. There are a plurality of radial holes 22 axially spaced from grooves 21 drilled into the stator 20. A plurality of pins 23 are inserted and firmly fitted in holes 22. The pins 22 are longer than the depth of the holes 22 in stator 20. There also may be added, though not required, a zerk fitting 25 and a channel 26 cut in the ring 20 to provide a reservoir for grease and/or lubricant in the groove 24 which is cut into the stator 20 between the pins 23. The groove 24 should be cut along the center line of the row of pins 23. This will provide lubricant at the pins 23 to lubricate the surface interface between the pins 23 and the radial surfaces 32a and 32b.

The second ring member 30 includes a plurality of inwardly extending flanges and grooves 31 which interface, in a complimentary manner, with the flanges and grooves 21 in the stator 20. The second ring member 30 also contains a recess 32 which is located on the inner side or housing side of the seal 40 and is located near the axial extremity of the rotating member 30. This recess or cavity 32 may be designed to have an axial width slightly greater than the diameter of the locking pins 23. The axial travel of the shaft occurs during operation as the shaft seeks magnetic center. The second ring member 30 also contains an "O" ring 60 of elastomeric material firmly fitted in said rotating member 30. This "O" ring 60 provides frictional engagement between the "O" ring 60 and the shaft 10 and rotates the rotating member 30.

A channel or slot 70 as in most labyrinth seals is formed between the rotating and stationary members 20 and 30 and connects the atmosphere or exterior environment with the interior of the housing 40. This labyrinth may in this vary in size due to the axial movement of the rotating member with respect to the fixed member or ring. This movement should be such that the various flanges and grooves 21 and 31 do not touch each other during the axial movement, but continue to provide a continuous labyrinth. The rotating member 30 may move along with shaft 60 in an axial direction, until the pin 23 comes in contact with a side wall of the cavity or recess 32. In FIG. 2, the axial movement of the shaft 60 has been to the right and the rotating member 30 moved axially until the side wall 32a comes into contact with the pins 23. These pins 23 are normally made of a lubricous material such as TEFLON™, which is generically known as polytetrafluoroethylene, or a TEFLON™ derivative. The pin 23 to rotor 30 contact is limited to the point contact on the circular surface of the pin 23 as an interface with flat surface 32a of the rotor groove or cavity. The same action occurs if the axial movement of the shaft and rotor is to the left.

The axial thrust is absorbed by the pins 23 and the side walls 32a or 32b. The frictional engagement between the pins 23 and side walls 32a and 32b is such that low wear and minimum heat occur.

As shown, additional lubrication may be supplied from the zerk fitting 25 through the channel 26 to the groove 24 in the stator member 20. This grease or lubricant will lubricate the interface between the pins 23 and the walls of the cavity 32. This grease or lubricant in the cavity 32 is subjected to centrifugal action by the rotating rotor 30 and may be deposited and cycled back into the groove 24 in the stator 20 when lubrication is not required. This occurs when the pins 23 are not in contact with either walls 32a or 32b.

In addition, if the axial movement of shaft 10 should be great enough that additional axial movement of the seal is required, additional axial movement is accommodated by utilizing the normal slipping of the shaft axially past the resilient drive means 60 as described in U.S. Pat. No. 5,174,583.

Having described the preferred embodiment, other features of the present invention will undoubtedly occur to those versed in the art, as will numerous modifications and alternations in the embodiments of the invention illustrated, all of which may be achieved without departing from the spirit and scope of the invention as defined in the appending claims.

What is claimed is:

1. A seal between a fixed housing and a rotating shaft comprising:
   a) a fixed housing;
   b) a shaft;
   c) a first ring member surrounding said shaft and affixed to said housing;
   d) a plurality of annular grooves and flanges extending axially at a first portion of said first ring member;
   e) a plurality of radial holes in a second portion axially removed from said first portion of said first ring member;
   f) a second ring member rotatable with said shaft;
   g) a plurality of annular grooves and flanges extending axially in a first axial portion of said second ring member and mating in a complimentary manner with said flanges and grooves in said first ring member forming a labyrinth channel between said first and second ring members;
   h) an annular recess in a second axial portion of said second ring member opposite said holes in said first ring member;
   i) a plurality of pins; and
   j) said pins inserted in said holes of said first ring member and projecting into said recess of said second ring member.

2. The invention in accordance with claim 1, wherein the axial dimension of said recess in said second ring member is slightly larger in the axial direction than axial dimension of said pins to allow limited relative axial movement of said second member with respect to said first ring member.

3. The invention in accordance with claim 2, wherein said pins are cylindrical.

4. The invention in accordance with claim 3, wherein said pins are made of a naturally lubricous material.

5. The invention in accordance with claim 1, wherein said annular recess in said second ring member is rectangular.

6. The invention in accordance with claim 1, wherein said first ring member further comprises an annular groove formed on the centerline of said holes.

7. The invention in accordance with claim 6, wherein said first ring member further comprises a reservoir channel to accumulate lubricant in said annular groove.

8. The invention in accordance with claim 1, wherein said grooves and flanges of said first and said second ring members are axially moveable by limited displacement relative to each other as the shaft moves axially relative to the first and second ring members.

* * * * *